US007269427B2

(12) United States Patent
Hoctor et al.

(10) Patent No.: US 7,269,427 B2
(45) Date of Patent: Sep. 11, 2007

(54) TRANSMITTER LOCATION FOR ULTRA-WIDEBAND, TRANSMITTED-REFERENCE CDMA COMMUNICATION SYSTEM

(75) Inventors: Ralph Thomas Hoctor, Saratoga Springs, NY (US); John Erik Hershey, Ballston Lake, NY (US); Nick Andrew Van Stralen, Ballston Lake, NY (US); Harold Woodruff Tomlinson, Jr., Scotia, NY (US)

(73) Assignee: General Electric Company, Niskayuna, NY (US)

( * ) Notice: Subject to any disclaimer, the term of this patent is extended or adjusted under 35 U.S.C. 154(b) by 1008 days.

(21) Appl. No.: 09/973,140

(22) Filed: Oct. 9, 2001

(65) Prior Publication Data
US 2003/0069025 A1   Apr. 10, 2003

(51) Int. Cl.
| | |
|---|---|
| *H04Q 7/20* | (2006.01) |
| *H04M 11/04* | (2006.01) |
| *H04B 7/00* | (2006.01) |
| *H04B 7/08* | (2006.01) |
| *H04B 17/00* | (2006.01) |
| *G01S 13/08* | (2006.01) |

(52) U.S. Cl. .............................. 455/456.2; 455/456.1; 455/456.5; 455/404.2; 455/524; 455/132; 455/115.1; 342/126

(58) Field of Classification Search .. 455/456.1–456.6, 455/452, 457–458, 404, 422, 432–433, 435.1, 455/440–442, 403, 404.2, 70, 524, 550.1, 455/556.2, 560–561, 67.16, 90.1, 91, 95, 455/115.1; 340/573.4, 572.4, 473.3
See application file for complete search history.

(56) References Cited

U.S. PATENT DOCUMENTS

| | | | | |
|---|---|---|---|---|
| 4,215,345 | A | * | 7/1980 | Frosch et al. ............... 342/465 |
| 4,641,317 | A | | 2/1987 | Fullerton |
| 5,933,079 | A | * | 8/1999 | Frink ...................... 340/572.4 |
| 6,031,490 | A | * | 2/2000 | Forssen et al. .......... 455/456.1 |
| 6,054,950 | A | * | 4/2000 | Fontana ..................... 342/463 |

(Continued)

OTHER PUBLICATIONS

"Ultra-Wideband Communications System," HW Tomlinson, Jr.; JE Hershey; RT Hoctor; Welles, II; U.S. Appl. No. 09/753,443, filed Jan. 3, 2001.

(Continued)

*Primary Examiner*—Meless Zewdu
(74) *Attorney, Agent, or Firm*—Fletcher Yoder

(57) ABSTRACT

A system and method involve tracking the location of objects within an area of interest using transmitted-reference ultra-wideband (TR-UWB) signals. The system includes at least three base stations communicating with a central processor, at least one mobile device and at least one fixed beacon transmitter of known location. The mobile device is equipped with a transmitter for transmitting a TR-UWB signal to a base station, which then determines a location of the mobile device based on time difference of arrival information between the beacon transmitters and mobile devices measured at all the base stations. Preferably, the area of interest includes a plurality of mobile devices each transmitting a delay-hopped TR-UWB signal according to a code-division multiple access scheme. The mobile devices may be attached to a patient and/or a medical asset within the hospital for tracking purposes. Additionally, patient medical information may be transmitted with the TR-UWB signals to allow patient monitoring to occur simultaneously with asset/patient tracking.

11 Claims, 5 Drawing Sheets

U.S. PATENT DOCUMENTS

| | | | |
|---|---|---|---|
| 6,230,018 B1 * | 5/2001 | Watters et al. | 455/456.3 |
| 6,246,882 B1 * | 6/2001 | Lachance | 455/456.4 |
| 6,442,392 B2 * | 8/2002 | Ruutu et al. | 455/456.1 |
| 6,459,989 B1 * | 10/2002 | Kirkpatrick et al. | 455/452 |
| 6,466,125 B1 * | 10/2002 | Richards et al. | 340/573.4 |
| 6,469,628 B1 * | 10/2002 | Richards et al. | 340/573.3 |
| 6,483,461 B1 * | 11/2002 | Matheney et al. | 342/463 |
| 6,519,464 B1 * | 2/2003 | Santhoff et al. | 455/456.5 |
| 6,519,465 B2 * | 2/2003 | Stilp et al. | 455/456.1 |
| 6,522,882 B1 * | 2/2003 | Chen et al. | 455/439 |
| 6,539,229 B1 * | 3/2003 | Ali | 455/456.1 |
| 6,707,424 B1 * | 3/2004 | Snyder et al. | 342/357.14 |
| 2002/0059535 A1 * | 5/2002 | Bekritsky et al. | 713/400 |

OTHER PUBLICATIONS

"Impulse Radio: How it works," Moe Z. Win, Robert A. Scholtz, IEEE communications Letters, vol. 2, No. 2, Feb. 1998, pp. 36-38.

* cited by examiner

| $N_p$ pulse pairs separated by time $D_1$ with data bit $B_1$ | $N_p$ pulse pairs separated by time $D_2$ with data bit $B_2$ | ••• | $N_p$ pulse pairs separated by time $D_{(Nc-1)}$ with data bit $B_{(Nc-1)}$ | $N_p$ pulse pairs separated by time $D_{Nc}$ with data bit $B_{Nc}$ |

TRANSMITTER LOCATION FOR ULTRA-WIDEBAND, TRANSMITTED-REFERENCE CDMA COMMUNICATION SYSTEM

STATEMENT REGARDING FEDERALLY SPONSORED RESEARCH & DEVELOPMENT

The U.S. Government may have certain rights in this invention pursuant to the National Institute of Standards and Technology Contract Number 70ANB0H3035 awarded by NIST.

CROSS REFERENCE TO RELATED APPLICATIONS

The subject matter of this application is related to co-pending non-provisional patent application Ser. No. 09/753,443 for "Ultra-Wideband Communication System", assigned to the assignee of this application.

BACKGROUND OF THE INVENTION

This invention relates to the use of ultra-wideband (UWB) radio communication systems. In particular, it pertains to a transmitted-reference, delayed hopped (TR/DH) UWB radio communications system for use in an asset tracking system.

Wireless, narrowband or conventional spread-spectrum communications systems have been proposed for tracking objects within an area of interest. Some of these systems are bi-directional and operate via polling. Others are one-way and transmit based on movement of an asset tag (a small transmitter attached to an item to be tracked) or according to some predetermined schedule which is independent of environmental conditions. Still other systems track objects based on time-difference-of-arrival (TDOA) information or by using crude field-strength measurements. In addition to their tracking function, such systems have been used to provide discrete status information which, for example, may indicate whether a device is powered on.

While narrowband and spread-spectrum systems have proven useful, they are not without drawbacks. For example, the performance of such systems may be adversely affected by interference from strong local RF emitters. The opposite is also true; i.e., because their transmitted energy is concentrated in a relatively limited spectrum, narrowband and conventional spread-spectrum systems may interfere with sensitive communications equipment located within or even external to the operating region.

Narrowband or spread-spectrum systems have also demonstrated poor performance in urban areas, or areas where there is a high concentration of electromagnetic interference. For example, such transmissions are often unable to penetrate building components (e.g., walls, steel structures, elevator shafts, etc.), thereby making their use impracticable in many cases. In addition, narrowband systems often require large power margins in order to combat significant frequency-selective fading, which is associated with indoor RF transmissions.

Time-Difference-of-Arrival (TDOA) is one method that is used to estimate the point of origin of a transmission observed at several receivers. This method requires that each receiver have access to a global clock or timebase so that local Time-of-Arrival (TOA) estimates made at the individual receivers can be compared. An observed difference in TOA at two receivers of known location defines a hyperbola on the plane containing the two receivers and the transmitter. Since the location of the application described here is indoors, the range of values taken by the height of the transmitter off the floor is limited. This being the case, one can approximate the problem by treating all receivers and all asset tags as though they lie in the same plane.

Because the TOA estimates from the various receivers will contain errors, the curves defined by pairwise differences of all receiver measurements will not necessarily intersect. Various procedures can be defined to develop a location estimate from such data. Perhaps the simplest of these is to pick the point on the plane that minimizes the sum of the normal distances from the point to all of the hyperbolas defined by the TDOA measurements. This computation typically takes place at a central computer, which communicates with the RF receivers, typically over a secondary wired network.

The secondary wired network is also used to distribute the global timebase to all the receivers in the system, which requires bandwidth on the wired network as well as extra hardware at the receivers. The requirement of extra bandwidth on the secondary wired network is a drawback, because it contributes substantially to the system cost.

To exemplify, U.S. Pat. No. 5,119,104 notably describes a conventional spread-spectrum system which operates by distributing a clock to a plurality of receivers in a tracking environment, and which then uses that clock to gate a time-of-arrival (TOA) count within each of a plurality of receivers. The TOA count is used to estimate the RF propagation distance between a transmitting tag and the receiver. To maintain ranging accuracy, the system clock must have very little skew between the receivers since each 1 ns of clock skew could introduce as much as 1 foot of ranging error in the system. Clock skew is easily introduced when the system clock is distributed with a cable. Therefore, cable lengths must be carefully measured or controlled during installation of the system, and calibrations must be made in the system to account for the different clock skews introduced by the cabling. This increases system cost and complicates installation as well as maintenance and repair of the system.

In view of the foregoing, it is therefore apparent that there is a need for an RF asset tracking system which overcomes the drawbacks of the conventional narrowband and spread-spectrum systems, and more specifically one which operates more reliably and economically regardless of environmental conditions and without the costly requirement of providing a single clock to all receivers in the system.

BRIEF SUMMARY OF THE INVENTION

An RF asset tracking system and method involve locating objects within an area of interest at lower cost and with fewer RF interference problems than conventional narrowband and spread spectrum systems. The communications method operates using a wider frequency spectrum than narrowband methods, and preferably one which may be classified as an ultra-wideband signaling system. Further, the method is multi-functional in that it both tracks the location of objects in the area of interest and monitors data describing a status or condition of those objects. Such a system and method may advantageously be used to track medical assets in a medical facility, for example, while simultaneously monitoring the physical condition of multiple patients in that facility. The method also results in the deployment of lower-cost hardware in that it does not require the distribution of a common clock to all receivers.

In accordance with one embodiment, the system and method involve tracking the location of objects within an area of interest using transmitted-reference ultra-wideband (TR-UWB) signals. The system comprises a central processing facility, at least three base stations in the area of interest, at least one beacon transmitter of known location, and at least one mobile device in an area of interest. The central processing facility communicates with the base stations over a low-bandwidth communications channel. The base stations are equipped with antennas and TR-UWB receivers that receive TR-UWB transmissions from the mobile devices and the beacon transmitter. The mobile device and the beacon transmitter are equipped with transmitters for transmitting TR-UWB signals to the base stations which then determine time-of-arrival (TOA) estimates for the signals transmitted from the mobile devices and beacon transmitter(s). The base stations send differences of TOA estimates associated with the mobile device and the beacons to the central processor over the low-bandwidth communications channel. The central processor uses that information to determine the location of the mobile device.

Preferably, the area of interest includes a plurality of mobile devices each transmitting a delay-hopped TR-UWB signal according to a code-division multiple access scheme. Each device transmits signals employing one of a number of sequences of transmitted-reference delays, in order to allow the base stations to demodulate multiple received transmissions that arrive at the receiver at the same, or close to the same, time. The transmissions are RF bursts that comprise a burst header, error control bits, and information that uniquely identifies the mobile device, such as, for example, a serial number. The mobile devices may be attached to a patient and/or a medical asset within the hospital for tracking purposes. According to an optional embodiment, patient medical information including physiological measurements may be transmitted with the TR/DH-UWB signals to allow patient monitoring to occur simultaneously with asset/patient tracking.

Unlike conventional systems, an accurate time-base signal is not required to be transmitted to a plurality of receivers situated within the tracking area. Instead, multiple beacon transmitters are situated at known locations in the tracking area, and the location of the mobile device is estimated from the differences in time of arrival between the mobile device transmissions and the beacon transmissions. These differences are computed at each base station in the system and are then transmitted to a central processor over a wired network.

DETAILED DESCRIPTION OF THE INVENTION

Figure 1:
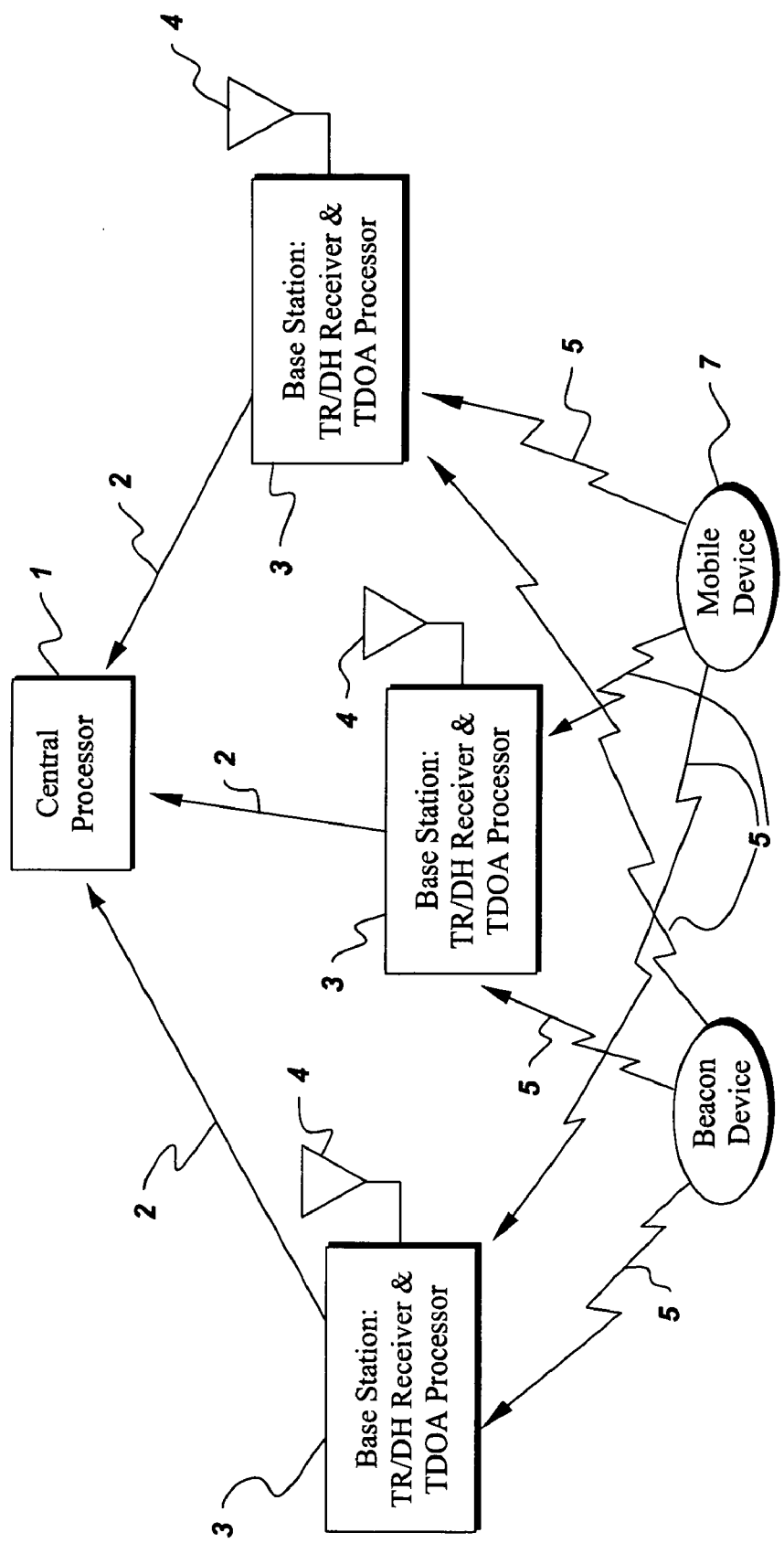
FIG. 1 is a diagram showing an area of interest in which a system of the present invention may be used.

Referring to FIG. 1, an embodiment of a communications system of the present invention includes a central processor 1 which communicates via low-bandwidth communications channel 2 to at least three base stations 3. The base stations are equipped with antennas 4 for receiving TR-UWB transmissions from one or more beacon devices 6 and one or more mobile devices 7, all of which are located within an area of interest. The area of interest may lie entirely within or include a medical facility, such as a hospital, to allow the base station to track the location of medical assets and/or patients, and if desired to receive physiological data from those patients. While the present invention is well suited for the hospital setting, those skilled in the art can appreciate that the area of interest may be any other area in which objects may be tracked or monitored, including day care centers for tracking children, warehouses for tracking inventory, mobile platforms for tracking development in a manufacturing process, and construction sites for tracking tools, workers, and/or materials, to name a few.

The mobile radio devices of the system are equipped with transmitters for sending inbound burst signals 5 to the base station. The receiver of the base station receives the signals from the mobile radio devices and beacon transmitters and communicates differences in times of arrival to the central processor which uses the data to determine the locations of the mobile devices. The inbound burst transmissions are identified to the base station by means of unique identifying information encoded in the RF burst. This identifying information may be, for example, a serial number or other ID number. The RF burst comprises, at a minimum, the identifying information, plus whatever header and error control fields are required for reliable reception. Such methods of framing data transmitted over a noisy communications channel are well-known in the communications arts; see, for example, Hershey and Yarlagadda, *Data Transportation and Protection*, Plenum Press, 1986.

In order to allow for a reasonable number of asset tags and beacons to be active simultaneously, preferred embodiments of the system of the present invention employ code-division multiple-access (CDMA) technology capable of supporting approximately 50 to 100 simultaneous transmitters, each at 1 to 5 Kbits/sec with bit error rate of less than $10^{-3}$. Advantageously, transmitted-reference, delay-hopped ultra-wideband (TR/DH-UWB) communications technology is capable of providing the aforementioned performance. An in-depth description of a TR/DH-UWB technology is described in co-pending U.S. patent application Ser. No. 09/753,443. A description of this system is provided below.

Signal Transmission/Detection Scheme

In its most basic form, a transmitted-reference communications system transmits two versions of a wideband carrier, one modulated by data and the other unmodulated. See, for example, Simon et al., *Spread Spectrum Communications*, Vol. 1, Computer Science Press, 1985. These two signals are recovered by a receiver and then are correlated with one another to detect the modulating data. The commonly used wideband carrier is a continuous, wideband pseudo-noise source, and the modulated and unmodulated versions are typically separated from one another in either time or frequency.

In accordance with preferred embodiments of the present invention, the transmitted carriers may be either RF pulses; continuous, wideband noise; or continuous, wideband pseudo-noise. As used herein, the term "transmitted-reference" refers to the transmission and reception of any of these wideband waveforms as the carrier of a transmitted-reference signal. Preferably, the separation between the modulated and reference versions of the waveform takes place in time, rather than frequency. The receiver correlates the received signal with a delayed version of itself over a finite interval to demodulate the signal.

Figure 2:
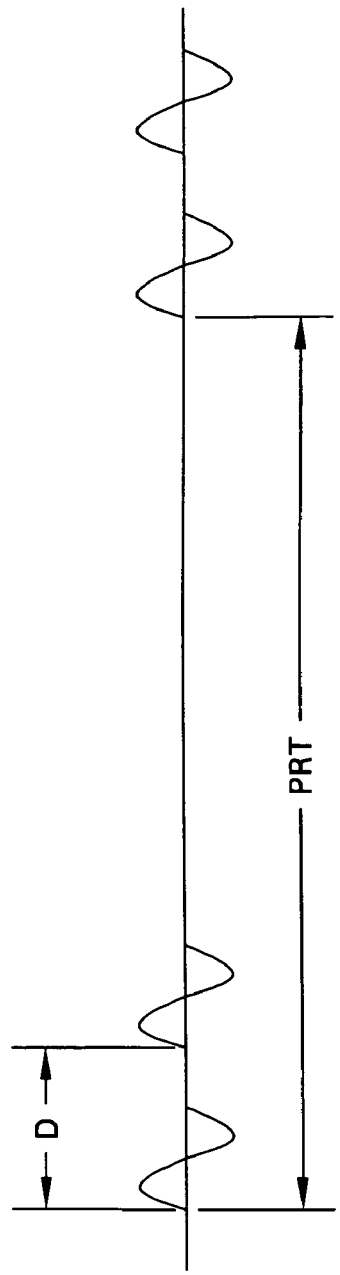
FIG. 2 is a diagram showing pulse pairs transmitted in a TR-UWB signal in accordance with preferred embodiments of the present invention.

FIG. 2 shows a signaling scheme for TR/DH-UWB signals in accordance with preferred embodiments of the present invention. As shown, a TR/DH-UWB scheme may be implemented by transmitting pairs of identical pulses (called doublets) separated by a time interval D, known to both the base station receiver and the mobile device transmitter. The transmitted data is encoded by the relative amplitude polarity of the two pulses. In FIG. 2, both pulses are shown to have the same polarity. More than one doublet may be associated with each information bit, as long as all the associated doublets have the same time interval D between pulses. This would be advantageous if the peak power of the individual pulses is near or below the noise floor; in this case multiple doublets can be integrated to improve the signal-to-noise ratio. The time over which all the transmitted doublets pertain to the same bit is known as the bit time, or in the context of the delay-hopping scheme discussed below, the chip time.

The doublets need not be transmitted at a regular rate. The interval between doublets, called the pulse repetition time (PRT), may be varied in order to shape the spectrum of the transmission. The pulse repetition time (PRT) is depicted in FIG. 2. Because a uniform PRT would result in undesirable line components in the spectrum, the PRT is preferably (but is in no way restricted to be) randomized. In addition, individual pulses in a doublet can be shaped in such a way as to concentrate their energy in certain frequency bands, as well known in the field of radar. The above methods can be used, if required, to accommodate various spectrum restrictions.

Figure 3:
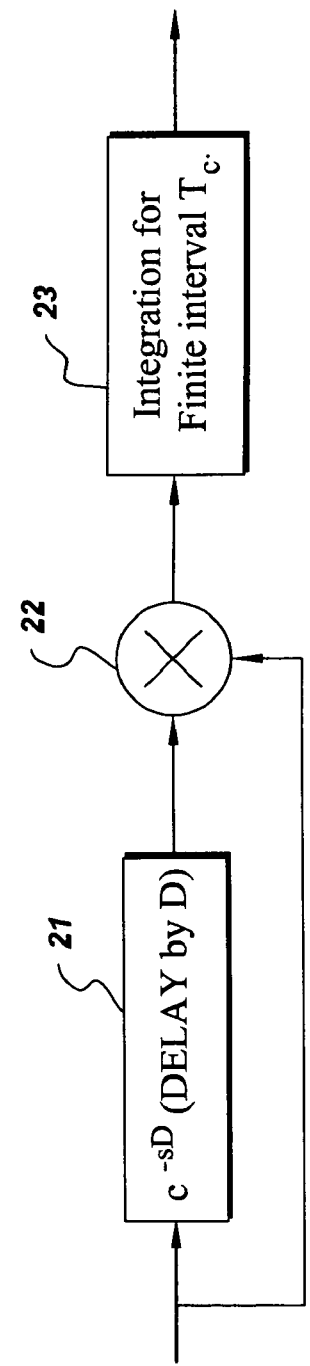
FIG. 3 is a diagram of a correlator circuit used to detect a TR-UWB signal in accordance with preferred embodiments of the present invention.

At the receiver, for each RF-pulsed-based, transmitted-reference signal received, encoded information is recovered from a doublet by computing the correlation at a lag given by D. This operation is performed by an electronic circuit called a pulse-pair correlation circuit, a block diagram of which is shown in FIG. 3. This circuit includes a delay 21, a signal multiplier 22 and a finite-time integrator 23. The signal is split into two paths, one of which is delayed by delay 21. The two versions of the received signal are multiplied in multiplier 22, and the product is integrated over a specified time, $T_c$, by integrator 23. The integration time is determined by the number of doublets making up the transmitted bit or chip. The delay is such that the leading pulse of the delayed circuit path is registered in time with the trailing pulse of the undelayed circuit path. This non-zero-mean product is integrated over a symbol interval, $T_c$, to produce an output signal. In an exemplary embodiment, delay 21 may be a circuit made by Micro-Coax in Pottstown, Pa., and a suitable candidate for signal multiplier 22 may be a four-quadrant Gilbert cell.

Note that, in practice, the output of the finite-time integrator is only required at some relatively small number of sampling instants. Therefore, the continuously-integrating finite impulse response (FIR) integrator can be replaced by several simple integrate-and-dump circuits, well known in the art, which are sampled in a round-robin fashion by the A/D converter and are dumped by the same clock that triggers the sampling.

A pulse-pair correlation circuit can have more than a single delay, where multiple delays have nominal values spread around the nominal value of the transmitter's delay. The delay actually used for demodulation is preferably chosen from among the existing delays as that one whose energy output has the highest energy in response to a transmission at the nominal delay. Naturally, this selection can be varied to account for drift in the delay value at the transmitter or receiver caused by temperature, voltage or component aging induced variations. The selection may be different for different transmitters.

In accordance with a preferred embodiment of the present invention, the mobile radio devices transmit TR-UWB signals according to a type of multiple access scheme known as delay hopping (DH). This transmission scheme is described in co-pending U.S. patent application Ser. No. 09/753,443, assigned to the instant assignee.

The term "delay hopping" refers to a multiple access technique that is related to delay modulation in the same way that "frequency hopping" is related to frequency modulation. Specifically, delay-hopping refers to the method of varying the delay used in TR-UWB transmission according to a fixed pattern known to the transmitter and to the receiver. This pattern constitutes a code word, and multiple access capacity is obtained through the code-division multiple access (CDMA) technique. See Andrew J. Viterbi, *CDMA Principles of Spread Spectrum Communication*, Addison-Wesley Publishing Co. (1995). Alternatives to the transmission scheme include the use of more than two pulses to form the TR transmission, inducing variation in the pulse repetition time to shape the transmitted spectrum, and transmission of pulses having designed frequency-domain characteristics.

Figures 4, 5:
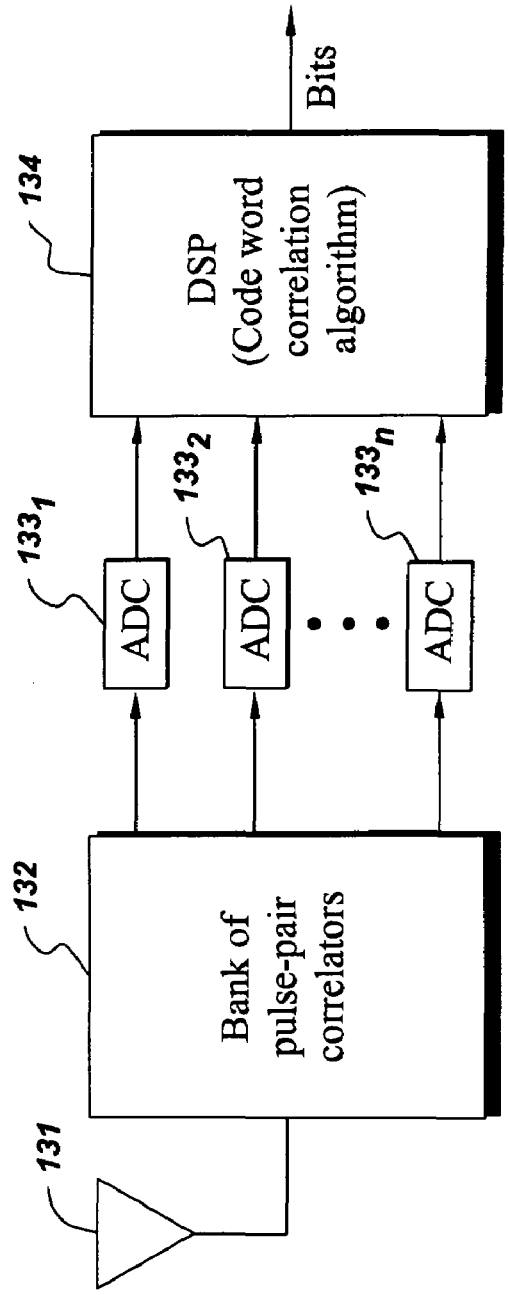
FIG. 4 is a diagram of a structure of a TR/DH code word used to transmit signals from multiple mobile devices in accordance with preferred embodiments of the present invention.
FIG. 5 is a diagram of a base station receiver which includes a bank of pulse-pair correlators for detecting delay-hopped, transmitted-reference signals from a plurality of mobile devices in accordance with preferred embodiments of the present invention.

On the signal level, a TR/DH code word consists of N chips, transmitted sequentially. Each chip is composed of $N_p$ doublets (or other n-tuples), all receivable with the same pulse-pair correlation circuit. Doublets transmitted in different chip intervals are, in general, characterized by different delays. The PRT within a given chip interval varies randomly about some nominal or average pulse repetition time. The structure of the TR/DH code word is depicted in FIG. 4.

Each chip comprises $N_p$ pulse pairs separated by inter-pulse delay $D_i$, with code word polarity bit $B_i$, i=1, 2, ..., $N_c$, where $N_c$ is the number of chips in the code word. Note that the chip values are distinct both in associated delay value and in the polarity of the transmitted chip (±1), since the individual pulses of any pulse pair can be transmitted either in-phase or out-of-phase, yielding either a positive or negative output from the pulse-pair correlator. When a code word of $N_c$ chips is used to send a single data bit, the entire code word may be negated on a chip-by-chip basis to represent one bit polarity, while the original code word is used to represent the other bit polarity. Naturally, it is also possible to represent different data values with completely different code words. If the data bit to be sent is zero, then all doublets in each chip of the code word are transmitted with the opposite polarity of the code word polarity bit.

The DH code words are an important part of the delay-hopped code division multiple access (CDMA) scheme. They can be constructed at the time of system design using computer search for words with desirable correlation properties. At the time of operation of the system, these words are known to the receiver and they are used to detect the transmitted bits. In one example, a set of 1000 code words was generated, each composed of 200 chips, with delays drawn from a set of 16 possible delays. All of these code words had auto-correlation side lobes that are less than 7% of the peak auto-correlation in absolute value. The maximum of the absolute value of the cross-correlation at any lag between any pair of these words was less than 10% of the peak auto-correlation. Longer codes, composed of more chips, will have even better correlation properties.

Preferred embodiments of the system of the present invention track multiple mobile radio devices within the area of interest based on TR/DH-UWB signals transmitted from the mobile devices. The base station receiver is configured to receive and demodulate these signals simultaneously, by applying separate correlator circuits, each associated with a separate delay-hopping CDMA code.

FIG. 5 shows one possible configuration for the base station receiver for detecting TR-DH signals. This receiver includes a bank of pulse-pair correlators 132 connected to antenna 131. Each correlation in the bank of pulse-pair correlators is tuned to a different delay. The bank of pulse-pair correlators is followed by a CDMA code word correlation. The code word correlation is implemented as software running on a digital signal processor (DSP) 134, programmable logic device (PLD), or application-specific integrated circuit (ASIC). The outputs of all of the correlators are sampled by analog-to-digital converters (ADCs) $133_1$ to $133_N$, and the digital data is transferred into the DSP 134. A typical sample rate for these ADCs is in the range of 2 Msps to 12 Msps. This rate is determined by the chip time. In general, it is desirable to have two or more samples per chip.

Figure 6:
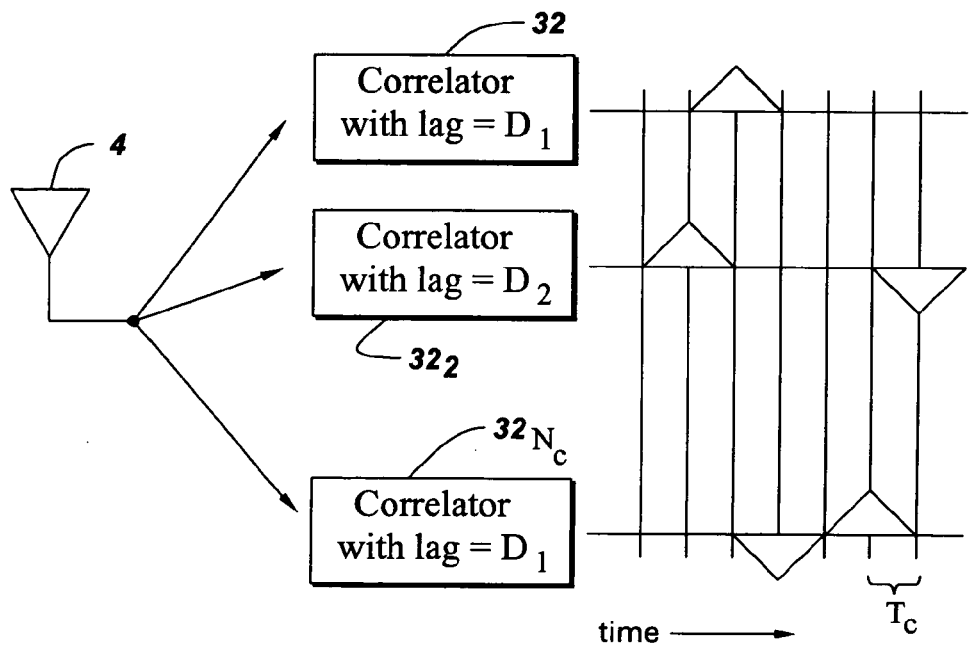
FIG. 6 is a diagram of a first stage of the UWB transmitted reference, delay-hopped (TR/DH) code division multiple access (CDMA) receiver included in a base station in accordance with preferred embodiments of the present invention.

The chip signals at the outputs of the bank of pulse-pair correlators are characteristically peaked as shown in FIG. 6. These signals are of duration approximately equal to twice the integration time of the pulse-pair correlators. This set of waveforms will be sampled at a rate yielding, typically, 2 to 5 samples per chip period, and then sent to the delay-hopped code word detector implemented in the DSP 134. The DH code detector algorithm will take samples of the multiple outputs of the bank of pulse-pair correlators and add them together in a manner dictated by the expected DH code word.

One objective of this operation is to produce the registered sum of all the chip signals. When the expected code word matches the transmitted code word, this operation will have the effect of applying a gating waveform, matched to the entire DH code word waveform, to the observed data. If the gating waveform matches the shape of the chip signal waveform, a matched filter is implemented; however, this requires knowledge of the relative timing of the receiver sample clock and the transmitter chip clock. This knowledge can be derived from the received data, as described below.

Specifically, if $N_s$ is the number of samples per chip (an integer), then the total number of sample times over which code word detection must be performed is $N_s$ times $N_c$. If $N_d$ is the number of different intrapulse-pair delays used by the code (and therefore the number of pulse pair correlators in the receiver), then the total number of samples to be retained for correlation is $N_s$ times $N_c$ times $N_d$. Of these samples, only those delays matching the delay specified by the structure of the code word should be added. Since the number of samples in each chip interval is specified to be an integer, the number of samples in each pulse-pair correlation output waveform is an integer. Furthermore, the samples of each of the pulse-pair correlation output waveforms have the same relationship to the start times of the chips for all the waveforms, so that they can be added up coherently, given a knowledge of the transmitted code word.

A schematic representation of the bank of correlators and its output waveforms, referred to herein as chip waveforms, is given in FIG. 6. The antenna 4 provides inputs to correlators $32_1$ to $32_{NC}$ which comprise the bank of pulse-pair correlators 132 in FIG. 5. To make the code correlation idea more concrete, an example follows.

Figure 7:
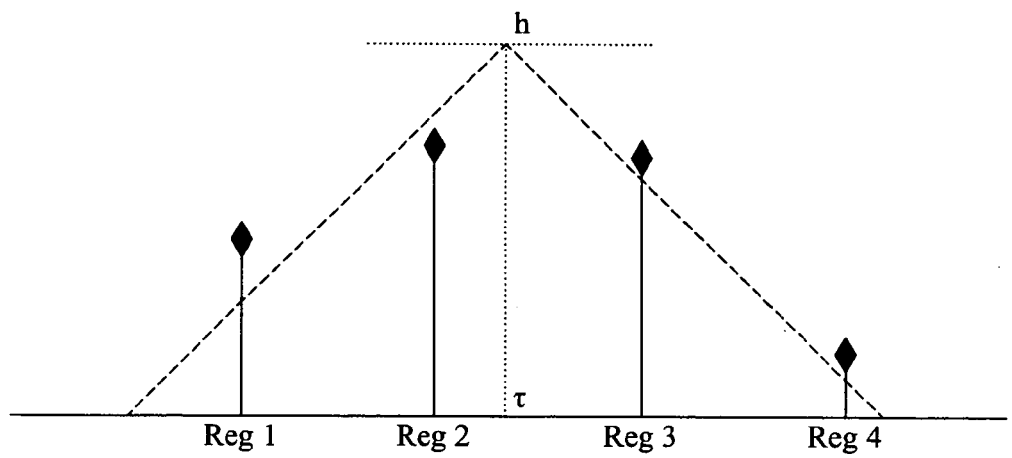
FIG. 7 is a diagram of a computational set-up for the code-word correlation performed by the delay-hopped CDMA receiver of FIG. 6.

Consider the receiver chip waveforms of FIG. 7. As an example, specify the number of delays as $N_d=3$ and the code word length as $N_c=5$, and consider the depicted set of pulse pair correlation output waveforms as representing a complete code word. This code word could be denoted by a sequence of delay indices and code word polarity bits: (2,1; 3,-1; 1,1; 3,1; 2,-1). The first chip of the code word has been specified to be expected on delay number 2 and will convey a transmitted bit value of +1; the second chip has delay value number 3 and bit value of -1, and so on. Assume that there are $N_s=2$ samples during each chip interval on each delay channel (each pulse pair correlation output). These samples are separated by $T_c/2$, where $T_c$ is the chip interval duration.

Thus, there are four samples for each waveform and each waveform is sampled at the same times relative to its own starting time. The four samples may be accumulated in 4 corresponding registers. The samples are collected three at a time, with all samples collected simultaneously. The four samples from each waveform could be transferred into the DSP 134 and multiplied by the expected chip values and the products added together, producing a sampled correlation output waveform at a much higher signal-to-noise ratio (SNR). The set of expected chip values includes zero, which is applied to combinations of delay channels and chip times not included in the code word.

Assume this result is computed at the time instant depicted in FIG. 7, assuming that the DSP 134 is correlating with the DH code word that has just been fully received. The oldest (leftmost) set of three input data samples available to the DSP would have a positive value on channel 2, and zeros on channels 1 and 3. The algorithm would multiply the value on channel 2 by 1, because the first chip is positive, and add the product to the first of four registers that had been initialized to zero. The second set of three samples consists of a larger value for channel 2, but also has zeros in channels 1 and 3. The algorithm adds the new value to register 2. The third set of samples contains non-zero data on both channels two and three. The data on channel three is negative-valued, but the second chip of the desired code word is also negative, so multiplication by the gating waveform negates the negative value, and a positive number is added to register 1. The positive value on channel 2 is multiplied by 1 and added to register 3. This process continues in the manner just described until all the samples in the code word are accumulated. In general, at each sample time, two non-zero samples will be added into two separate registers. The result of this process is depicted in FIG. 7, for the case where the expected code word has just been received and the transmitted bit value is +1. The values plotted are the final values of the four registers.

Once the output samples of the code word correlation (represented by black diamonds in FIG. 7) have been formed in the DSP 134, the receiver must decide if a code word has been received during the last sample interval. This decision is to be made by comparing the energy in the compounded, received samples to a threshold. If this decision is positive, other data must be derived from the samples. In the data transmission application of TR/DH, the code word would be modulated by a +1, which would represent the transmitted information.

One way to estimate this value is to fit a model of the pulse-pair correlation output waveform to the samples at the output of the code word generator. Such a fit could be done on the basis of minimum squared error, which would result in the optimum fit for Gaussian observation noise. It can be demonstrated that the observation noise is Gaussian. The possible result of this algorithm is shown in FIG. 7, superimposed over the sample values. The fitted model is controlled by two parameters, the amplitude, or height, h, and the location of the peak, $\tau$. This information can be supplemented by the sum of squared errors for the best fit whose peak value is within the current sample interval. The absolute value of the peak value and the sum of squared errors can be combined and compared to a threshold to detect the code word. The value of $\tau$ can be used as an estimate of the timing phase of the code word. The sign of the estimated value of h can be used to detect the transmitted bit value.

When the receiver is looking for a TR-DH code word without any prior synchronization information, the algorithm just described is executed for each new set of samples, that is, at the end of each sample interval. When the receiver is receiving a sequence of TR/DH symbols, only samples close to the expected time of the next bit need be processed. An alternative method of bit detection for the data transmission application would be a matched filter applied to the output of the code word correlation. This would require an estimate of the value of $\mp'$, which could be obtained and refined by standard methods, such as the well-known early/late gate scheme as described by J. G. Proakis in *Digital Communications*, 3d Ed., McGraw-Hill, 1995, for example. Application of this scheme to the present invention would involve the interpolation of two waveform values from the data in the registers labeled in FIG. 7. These values would be early and late gates spaced symmetrically around the peak at $\mp'$.

Figure 8:
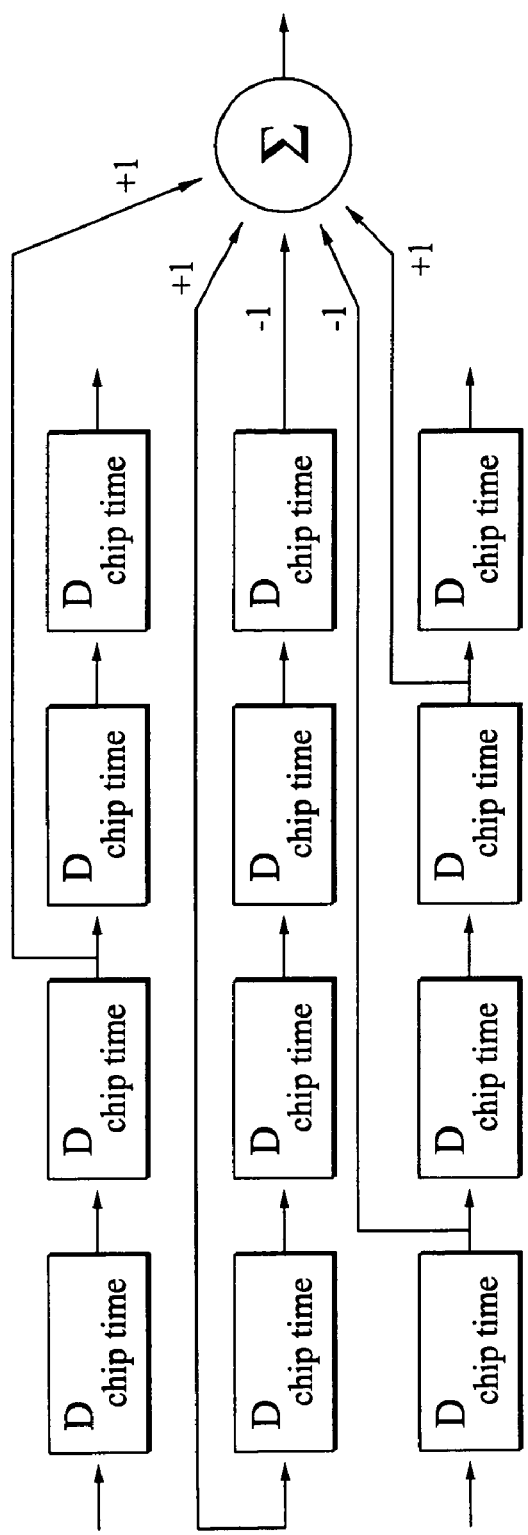
FIG. 8 illustrates a correlator for the delay-hopping UWB transmission illustrated in FIG. 6.

A CDMA code correlator is used to gather all of the elementary correlator outputs together in time and add them together with proper polarity. FIG. 8 depicts a hardware CDMA code correlator that does this for the elementary correlator outputs sketched in FIG. 6. Note that the chip time delays and signs (additions and subtractions) cause the elementary correlator peaks to be aligned in time with the same signs. Since the sample period of the A/D converters has been specified to be a fraction of the chip period, the delays in FIG. 8 may all be implemented as a number of digital storage devices, with provision for passing stored data from one to the next. Thus, FIG. 8 depicts a synchronous digital circuit such as would be implemented in a programmable logic device or ASIC.

The foregoing operations cause a large signed output at a UWB bit time. The sign of the large output is interpreted as the binary value of the UWB bit transmission. A set of CDMA code correlators is referred to as a CDMA correlator bank (CCB).

Time of Arrival Estimation

Described hereinabove is how the timing phase of received bits can be estimated. The same procedure can be used to establish a difference of times of arrival relative to a local clock. The parameter $\tau$ produced by the algorithm, described above and depicted in FIG. 7, identifies the time at which the detected bit arrived relative to the sample clock. That is, it is an estimate of the time between the end of the last transmitted chip and that "tick" of the sample clock that was closest to it. This time interval can be added to a specific time related to the processing, such as the time of the last sample that contributed to the estimate of $\tau$. This sum identifies a specific time, relative to the sample clock, which is related to the time of arrival. The local time marker formed in this way can be compared to any other such estimate, derived for a separate transmission in the same way, and with respect to the same local clock or with respect to a clock synchronized to the local clock. The two estimated parameters will both bear the same relationship to the true times of arrival of the two transmissions, and their difference will be the actual difference in time of arrival of the two transmissions. These computed differences in arrival times can in turn be used to estimate locations of transmitters when combined with similar data from other receivers, as described below.

The following steps are used to estimate the time markers from which the difference in times of arrival of two transmissions can be estimated.

1. The transmitter sends a burst of TR/DH-UWB modulated information. The time of this transmission is determined by clock circuitry internal to the asset tag and is unknown to the receiver.

2. The receiver processes the output samples of the bank of pulse-pair correlators, as depicted in FIG. 5. For each new set of ADC samples, the DSP circuit performs the CDMA code word correlation operation, and attempts to detect the presence of an RF burst by correlating the output of the CDMA correlator with a known burst header, or identifying bit pattern.

3. After the RF burst is detected, the value of the parameter $\tau$ is estimated. Note that this value will lie in an interval between samples that are taken after the detection occurs. As each new set of ADC samples is processed by the CDMA code correlator, a new estimate of r can be produced. Associated with each such estimate is a value of the sum of squared errors for the fit of the model, and the estimate with the lowest model fitting error is chosen from some fixed number of sample periods following the RF burst detection.

4. The value of $\tau$, expressed as a fraction of a sample interval, and the index of the last sample to enter the CDMA code correlator, are saved for each transmission, along with a unique identifier derived from the transmission that identifies the device that originated the transmission.

The difference between the times of arrival of two transmissions is computed by taking the difference:

$$TOA \text{ difference} = (\tau_1 + \text{sample\_index}_1) - (\tau_2 + \text{sample\_index}_2),$$

where the subscript refers to which of the received transmissions is being used to provide information.

In the time-of-arrival estimation method described above, what is actually measured is the time of the peak of the first chip signal of the packet. This peak represents the time at which pulse-pairs separated by a certain lag stop arriving. If all the mobile devices observe only a direct-path transmission from the transmitter, then the time-difference of-arrival values will give very accurate information about the relative distances between the receiver and the two transmitters involved. That is, the time-difference-of-arrival value will accurately represent the sum of two components: first, the difference between the direct-path propagation times from the two transmitters to the receiver and, second, the difference in times of transmission of the two transmitters.

On the other hand, any multipath will tend to spread out (in time) the peaks of the chip signals, which will have the effect of delaying the detected times of arrival relative to the direct path times of arrival. This delay is likely to be on the order of 10 to 50 ns for an indoor environment resembling an office building. (See Saunders et al., *Antennas and Propagation for Wireless Communication Systems*, John Wiley & Sons, 1999.) This delay translates into an equivalent range error of 50 feet at maximum (30 feet on average). Although this seems large, simulations show that, using the location method described below with four receivers and 15 beacons, all well-placed with respect to the transmitter, the final location error is on the order of six feet. The effect of "bad" receiver placement varies with the specific configuration but it is possible that large errors in location estimation may result. In general, enough receivers and beacons must be deployed so that every possible tag location is covered from a large number of angles. Also, there will always be individual cases where the effect of a particular multipath situation will cause an unusually large error.

Another potential source of inaccuracy in the TOA estimate is clock mismatch between the transmitter's chip clock and the receiver's sample clock. Such a mismatch has the effect of shifting the locations of the samples on the waveforms that emerge from the pulse-pair integrators. Over the course of the reception of a bit, this precession of the phase of the sample clock with respect to the phase of the received waveform has the effect of smearing out the waveform in time. For example, if the transmitted bit is 400 microseconds long, and the transmit and receive clock frequencies are mismatched by 10 PPM, then the composite waveform at the output of the CDMA code correlator will be smeared by 4 nanoseconds. The expected value of the resulting TOA estimation error would be half that value. Unlike multipath, which produces only over-estimation errors, this precession in clock frequencies may result in either over- or under-estimation of the TOA. Those skilled in the art will appreciate that the maximum clock mismatch is determined by the stability of the oscillators used to produce the transmit and receive clock waveforms. The maximum clock frequency mismatch and the allowable error due to it will determine the maximum length of a bit that may be coherently combined to form a TOA estimate. The bit length directly influences the detection probability, and therefore the maximum transmission range. Such design trade-offs can be made by one skilled in the art.

Tracking and Asset Monitoring

According to a preferred embodiment, the system and method of the present invention tracks the location of patients and/or medical assets within a hospital environment. In performing this tracking function, the mobile radio devices transmit TR-UWB or TR-DH UWB signals to the base station, and the base station detects and processes these signals to determine the locations of the mobile devices within the area of interest.

If multiple fixed receivers are in the area of interest, all with access to a shared clock, then a set of time-of-arrival differences can be generated, one for each pair of receivers. However, because tag transmitters are typically inexpensive, it is advantageous to avoid the distribution of a shared clock to all receivers through the use of beacon transmitters.

Beacon transmitters are essentially asset tags of known location, the Time-of-Arrival (TOA) estimates derived from which can be used to solve for the locations of the asset tags in a manner to be described. The beacons are required to have known locations, just as the locations of the receivers are required to be known. However, the time of the beacon transmissions are not required to be known (and therefore may be "free-wheeling"), and the beacon transmissions do not have to be synchronized to the system. The following discussion addresses the problem of estimating the location of the tag from differences between the estimated tag TOA at a given receiver and the last estimated beacon TOA at the same receiver for all beacons.

It is assumed that the tag transmission can be received at R receivers, and that a set of B beacons can also be received at all of the R receivers. In practice, R might be 3 or 4 and B might be 10 or more, for example. The observed data from the TOA measurements is $$m(i) = t(i) + N_i = T + \frac{d(i)}{c} + N_i, \tag{1}$$

$$m_b(i, j) = t_b(i, j) = T_j + \frac{d_b(i, j)}{c} + N_{i,j},$$

for receivers i=1, ..., R and beacons j=1, ..., B, and where $N_i$ and $N_{ij}$ are random variables having a distribution with mean $\mu$ and variance $\sigma^2$. T represents the transmission time of the tag, $T_j$ at the last transmission time of the $j^{th}$ beacon; t(i) represents the actual (unknown) time of arrival of the tag transmission at the $i^{th}$ receiver; and $t_b(i,j)$ represents the actual (unknown) time of arrival of the beacon transmission from the $j^{th}$ beacon at the $i^{th}$ tag. (Note that the observation is the sum of the actual time of arrival plus an estimation error represented by $N_i$ or $N_{ij}$.) The quantity c is the speed of propagation and the quantities given by lower case d's are the distances to the $i^{th}$ receiver of the tag and beacons. From these observations, the differences are formed (locally, at the receivers):

$$\begin{aligned}\delta_{i,j} &= c(m_b(i,j) - m(i)) \\ &= d_b(i,j) - d(i) + c(N_{i,j} - N_i) + c(T_j - T) \\ &= d_b(i,j) - d(i) + X_{i,j} + D_j\end{aligned} \tag{2}$$

where ($T_j$–T) is the difference in transmission time between the $j^{th}$ beacon and the tag, with $D_j$ the equivalent distance, given c.

Assume that the error variable in the differences, $X_{ij}$, is distributed $N(0, 2c^2\sigma^2)$. If the TOA estimation errors in equation (1) are Gaussian, then their difference is exactly distributed in this way. If the error distributions are anything else, then their convolution will at least have a peaked shape, and the normal distribution can be used as an approximation to that shape. The error random variables have the following covariances:

$$E\{X_{i,j}X_{n,k}\} = \begin{cases} 2c^2\sigma^2 & \text{if } i=n \text{ and } j=k \\ c^2\sigma^2 & \text{if } i=n \text{ and } j \neq k \\ 0 & \text{otherwise}(i \neq n) \end{cases} \tag{3}$$

The unknown parameters in Equation (2) are the distances from the tag to the $i^{th}$ receiver, d(i), and the equivalent distances to the times between the beacon and tag transmissions, $D_j$. All of these parameters are estimated at once; the $D_j$'s are nuisance parameters whose estimates will be discarded. The d(i) values are parameterized using the unknown planar location of the tag and the known location of the $i^{th}$ receiver as:

$$d(i) = \sqrt{(x-x_i)^2 + (y-y_1)^2} \qquad (4)$$

and then define the vector of parameters to be estimated as $$\Theta = [x, y, D_1, D_2, \ldots D_B] \qquad (5)$$

If we define the vectors $$\delta_i = \begin{bmatrix} \delta_{i,1} \\ \delta_{i,2} \\ \vdots \\ \delta_{i,B} \end{bmatrix} \text{ and } \mu_i(\Theta) = \begin{bmatrix} \sqrt{(x-x_i)^2 + (y-y_i)^2} - d_b(i,1) - D_1 \\ \sqrt{(x-x_i)^2 + (y-y_i)^2} - d_b(i,2) - D_2 \\ \vdots \\ \sqrt{(x-x_i)^2 + (y-y_i)^2} - d_b(i,B) - D_B \end{bmatrix} \qquad (6)$$

then we can write the likelihood function immediately as:

$$f(\delta_1, \delta_2, \ldots, \delta_R | \Theta) = (\pi^{RB} \det(\Sigma)^R)^{-\frac{1}{2}} \exp\left[-\frac{1}{2} \sum_{i=1}^{R} (\delta_i - \mu_i(\Theta))^T \Sigma^{-1} (\delta_i - \mu_i(\Theta))\right]$$

and the log likelihood function is proportional to $$\lambda(\delta_1, \delta_2, \ldots, \delta_R | \Theta) = -\frac{1}{2} \sum_{i=1}^{R} (\delta_i - \mu_i(\Theta))^T \Sigma^{-1} (\delta_i - \mu_i(\Theta)) \qquad (7)$$

where the covariance matrix $\Sigma$ is easily obtained from Equation (3).

The log likelihood can be maximized numerically without the need to pre-compute the gradient by use of the well-known optimization method of Hooke and Jeeves. That procedure is simply a cyclical coordinate search followed, at each iteration, by an extra line search along the line connecting the current solution to the last one. This algorithm as described above, while acceptable in its performance, tends to require a great deal of computation to arrive at a location estimate.

A faster and more preferred approach is based on Equation (2). Note that in equation (2), if one averages over all the receivers for a given beacon, the error terms that are averaged are uncorrelated. That being the case, the D's can be estimated for a given tag location $(\hat{x}, \hat{y})$, as $$\begin{bmatrix} D_1 \\ D_2 \\ \vdots \\ D_B \end{bmatrix} = \frac{1}{R} \sum_{i=1}^{R} \delta_i + \begin{bmatrix} \sqrt{(\hat{x}-x_i)^2 + (\hat{y}-y_i)^2} - d_b(i,1) \\ \sqrt{(\hat{x}-x_i)^2 + (\hat{y}-y_i)^2} - d_b(i,2) \\ \vdots \\ \sqrt{(\hat{x}-x_i)^2 + (\hat{y}-y_i)^2} - d_b(i,B) \end{bmatrix} \qquad (8)$$

which speeds up the computation considerably. Note that the sample means given in equation (8) are MLE's of the $D_j$, conditioned on $(\hat{x}, \hat{y})$. The accelerated algorithm is given by the following steps:

1. Choose a starting point on the plane;
2. For the current (x,y), compute the $D_j$ as in equation (8);
3. Using the newly computed valued of the $D_j$ in equation (7), perform a line search in the x and y dimensions to maximize the log likelihood given by equation (7);
4. Perform a line search in the direction defined by connecting the location at the end of the last iteration to the location at the end of step 3; and
5. If the change in location is less than $\epsilon$, then stop; otherwise go to step 2.

The results of the modified method are substantially the same as those of the method given above.

In the asset tag location system, the algorithm described herein would be run on a central computer that would be attached to all the base stations by a low bandwidth wired network. For every received tag transmission, every base station would send to the central computer the difference between the estimated TOA of the tag transmission and the estimated TOA of the last beacon transmission for every beacon. If the beacons transmit a burst every T milliseconds, then the base stations must be able to time out and represent an interval of duration T milliseconds to a high enough degree of precision that the TOA estimation error is the dominant error in the measurements. This goal will be achieved if the error in the timekeeping is less than 10% of the variance of the measurement error of the differences of tag and beacon TOA's.

It is important to note that the beacon transmissions can overlap, because there are a multiplicity of them in a fixed interval, and because they require time to occur. This overlap does not cause any problem in the present invention, since the TR/DH modulation scheme used in the transmissions allows the times of arrival from overlapping transmissions to be independently measured, without interference between the measurements.

One source of additional information for error reduction is the use of floor-plan constraints. The location algorithm can be equipped with a "map" of the hospital which describes each possible location with a quantity representing the likelihood that a patient or piece of equipment might be there. This could be used, for example, to construct an a priori distribution in an explicitly Bayesian location estimation scheme. Such an a priori distribution would have relatively large values associated with allowable tag locations and small or zero values associated with tag locations that were not physically possible. The log likelihood function of (7) would be modified by the addition of the log of the a priori distribution, which would produce the log of the a posteriori distribution. The addition of the log a priori distribution would have the effect of adding a penalty function to the objective function in the numerical optimization procedure, which might modify the location of the maximum. The "maximum a posteriori probability" estimate found by locating the mode of the a posteriori distribution will incorporate the available knowledge of the floor plan.

In one embodiment, a location estimation system comprises a plurality of base station devices distributed within the tracking area and connected by cabling to a centrally located processor. The system also comprises a plurality of fixed beacon transmitters distributed within the tracking area, the locations of which are known to the system. A mobile asset tag transmits a transmitted reference, delay-hopped UWB signal made up of pulse pairs according to the modulation method described above. The plurality of fixed beacon transmitters also transmit such signals, and their transmissions are not synchronized to the location estimation system in any way. The transmissions are RF bursts, which are structured as packets of binary information using the TR/DH modulation scheme. At least part of the information contained in each such packet is a unique identifier of the transmitter that originated the RF burst. Assuming that an asset tag transmission and at least one fixed beacon transmission is received by at least three base stations, the centrally located processor can solve for the asset tag's (x,y) or (length, width) position by the algorithm given above.

In accordance with another embodiment, the system and method of the present invention monitors physiological data (e.g., cardiac information from heart patients) of the patients carrying mobile radio devices. Configured in this manner, such a system would be a medical telemetry system that uses TR/DH communications to transmit EKG and other physiological data from patient data transmitters worn by ambulatory patients. These transmissions would be received by antennas located all over the hospital, and the transmitted waveforms would be displayed at a central station for monitoring.

In this application, the mobile devices transmit the physiological data in the TR/DH-UWB modulation format to enable the base station to performing tracking and patient monitoring functions simultaneously, or serially, if desired. If known-data fields are embedded in the TH/DH-UWB transmission, then these fields can be treated by the base stations in the same way that the asset tag bursts are treated. Their TOA's can be estimated and compared to the TOA's of beacon transmissions. These differences can be sent to a central processor for estimation of the location of the transmitter in the same way as the asset tag data.

Advantageously, unlike conventional TDOA systems which require a distributed system clock, the systems described hereinabove use fixed transmitters placed at known locations in the tracking environment. Each fixed transmitter operates on its own local clock that does not have to be synchronized with a system clock. The fixed transmitters send message packets at regular time intervals, and the difference in arrival time between the fixed transmitter packet and the mobile tag transmitter packet is measured in each receiver using the receiver's local clock. The arrival time difference is then sent via a local area network to the location processor where it is used to compute the mobile tag location using a maximum likelihood algorithm.

The fixed transmitters are an improvement over those used in conventional TDOA systems, such as disclosed in U.S. Pat. No. 5,119,104, since they replace the distributed system clock and are used to characterize the local multipath environment, temperature and humidity variations. A separate TOA packet need not be transmitted to the location processor to perform calibration since the time difference between the fixed and mobile packets is transmitted. This reduces the required LAN bandwidth in the system. In addition, special searching or triggering of the received signal to detect the direct path of the transmitted RF signal are not needed. The receiver provides a signal that represents the average multipath signal from the local environment, which is compared to that received from a fixed transmitter in the same general area.

While the invention has been described in terms of preferred embodiments, those skilled in the art will recognize that the invention can be practiced with modifications within the spirit and scope of the appended claims.

What is claimed is:

1. A method for determining a location of an object within an area of interest, comprising:
   transmitting an RF signal from the object to at least three receivers;
   transmitting a signal from a beacon transmitter to the at least three receivers, said beacon transmitters being at a known location, and having an independent local clock;
   calculating, at each of the at least three receivers, a plurality of time differences of arrival data based on the signal from said beacon transmitter and the RF signal transmitted from the object; and
   determining a location of the object within said area of interest based on said time differences of arrival data from said at least three receivers.

2. The method of claim 1, wherein said RF signal comprises a ultra-wideband signal.

3. The method of claim 2, wherein said ultra-wideband signal comprises a transmitted-reference ultra-wideband signal.

4. The method of claim 2, wherein said ultra-wideband signal comprises a transmitted-reference, delayed hopped ultra-wideband signal; and wherein the step of transmitting a transmitted-reference, delayed hopped ultra-wideband signal comprises generating pairs of pulses separated by a time interval D and encoding by relative polarity of pulses of said pairs; and wherein the step of calculating time difference of arrival information comprises delaying received signals by the time interval D.

5. The method of claim 4, wherein the step of transmitting further comprises generating the pairs of pulses at a pulse repetition rate which is variable in order to shape a spectrum of transmission.

6. The method of claim 4, wherein transmitted-reference, delayed hopped ultra-wideband signals are transmitted from a plurality of objects, each transmitted-reference, delayed hopped ultra-wideband signal having a different time interval D between pulses of said pairs.

7. The method of claim 6, wherein the step of transmitting the ultra-wideband signal further includes transmitting medical information of said patient with the ultra-wideband signal.

8. The method of claim 2, wherein the step of transmitting the ultra-wideband signal is performed by a transmitter carried by a patient, and wherein said area of interest is a medical facility.

9. The method of claim 2, wherein the step of transmitting the ultra-wideband signal is performed by a transmitter attached to medical equipment, and wherein said area of interest is a medical facility.

10. The method of claim 1, wherein the step of determining a location of the object comprises using a maximum likelihood algorithm.

11. The method of claim 1, wherein the step of determining the location of the object comprises using a maximum likelihood algorithm.

* * * * *